US006296953B1

(12) United States Patent
Lindén et al.

(10) Patent No.: US 6,296,953 B1
(45) Date of Patent: Oct. 2, 2001

(54) STEEL ALLOY FOR COMPOUND TUBES

(75) Inventors: Johan Lindén, Gävle; Urban Forsberg, Sandviken, both of (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/485,120

(22) PCT Filed: Aug. 10, 1998

(86) PCT No.: PCT/SE98/01454

§ 371 Date: Apr. 6, 2000

§ 102(e) Date: Apr. 6, 2000

(87) PCT Pub. No.: WO99/10554

PCT Pub. Date: Mar. 4, 1999

(30) Foreign Application Priority Data

Aug. 12, 1997 (SE) .................................................. 9702909

(51) Int. Cl.$^7$ ................................. B32B 15/01; C21D 9/08
(52) U.S. Cl. .......................... 428/681; 138/143; 148/519; 148/529; 420/79; 420/103; 428/682; 428/683; 428/684; 428/685; 428/686; 428/924; 428/925
(58) Field of Search ..................................... 428/681, 682, 428/683, 684, 685, 686, 924, 925; 138/143; 420/40, 43, 44, 46, 47, 48, 50, 51, 52, 53, 54, 55, 56, 57, 59, 62, 63, 67, 68, 69, 70, 77, 78, 79, 80, 81, 83, 103, 104, 105, 108, 109, 110, 111, 112, 117, 118, 119, 120, 123, 124, 125, 126, 127, 128, 583, 584.1, 586.1, 588; 148/325, 327, 331, 333, 334, 335, 336, 337, 442, 909, 519, 590, 592

(56) References Cited

U.S. PATENT DOCUMENTS 5,720,920 * 2/1998 Kato et al. ............................ 420/103
6,010,581   1/2000 Rosén et al. .

FOREIGN PATENT DOCUMENTS 440258   8/1991 (EP) .
2122221  1/1984 (GB) .

OTHER PUBLICATIONS

Rosén et al., U.S. application No. 09/379,616, filed Aug. 24, 1999.

Forsberg et al., U.S. application No. 09/485,123, filed Mar. 17, 2000.

Henrik Stahl et al., "Survey of Worldwide Experience with Metal Dusting", presented at the AlChE Ammonia Safety Symposium, Tucson, Arizona, USA, Sep. 18–20, 1995.

H.J. Grabke et al., "Metal Dusting of High Temperature Alloys", Wekstoffe und Korrosion, vol. 44, Dec. 1994, pp. 89–97.

* cited by examiner

*Primary Examiner*—Robert R. Koehler
(74) *Attorney, Agent, or Firm*—Burns, Doane, Swecker & Mathis, L.L.P.

(57) ABSTRACT

A compound tube comprises a layer of a Fe—Cr—Al-alloy and a layer of a load-carrying component and optionally one or several additional layers. The Fe—Cr—Al-alloy has the following analysis in weight-%: carbon<0.3, chromium 5–30, nickel<10, manganese<5, molybdenum<5, aluminium 3–20 , silicon<5, nitrogen<0.3, cerium+bafnium+yttrium<1.0, titanium 0.005–1.0, zirconium 0.005–1.0, niobium 0.005–1.0, the remainder iron, and naturally occurring impurities. These tubes are very resistant towards carbonization and "metal dusting" and are being used to advantage for bayonet tubing, superheat tubing and reformer tubing in steam formation.

11 Claims, No Drawings

STEEL ALLOY FOR COMPOUND TUBES

The present invention relates to the use of a ferritic iron chromium aluminium alloyed construction material for the production of multi layered compound tubes, which must meet the demands for good resistance against oxidation, carburisation and so called "metal dusting" in applications such as bayonet tubes, superheater and reformer tubes in steam reforming plants. Such an outer or inner material component is especially advantageous in a co-extruded tube, where the inner, alternatively the outer, material component consists of a conventional steel or a nickel base alloy with good strength. The invention also relates to the compound tubes per se.

With compound tube is intended a tube consisting of two or more layers with so called metallurgical bonding between the components. Metallurgical bonding is for instance necessary in order to maintain a good thermal conductivity. The compound tube is made by so called co-extrusion.

Steam reforming means the process steps for the production of so called synthesis gas, for generation of for instance ammonia, methanol and hydrogen gas, where water vapour is mixed with hydrocarbons in order to form hydrogen gas and carbon oxide. With reformer tubes are meant the catalyst filled tubes in which steam and hydrocarbons are converted wholly or partially to hydrogen gas and carbon oxide at high temperatures. Bayonet tubes are in this context a type of tubes placed inside the reformer tubes and function as a heat exchanger as the process gas which flow through them emits its heat to the gas which flows on the outside. Superheater tubes are placed, in the form of coils or cores, after the reformer and are used in order to cool down the process gas by super heating of steam.

The solutions, which are used today for bayonet tubes, superheater and reformer tubes, where metal dusting constitutes a problem, are generally nickel base alloys or stainless steels However, these materials have limited resistance against metal dusting, which gives a shortened length of life or results in that non optimum process parameters for the exchange must be used in the steam reforming. The nickel base alloys are further very expensive due to high amounts of alloying elements and demanding manufacturing processes.

A first aim with the present invention is consequently to develop a more resistant product to a lower cost than the present solution. This aim has been achieved by using alloys having a composition according to the present invention.

The production of the compound tube is done in a way that the two different components are made to bars in a conventional manner. The bars are drilled and turned with close tolerance demands and are put together to a co-extrusion blank. The corrosion protective ferritic iron chromium aluminium alloyed material usually constitutes between 20–50% of the total wall thickness.

The blank is heated to a temperature between 900 and 1200° C. and is co-extruded into a tube. The co-extruded tubes cools in air in order to minimise bent tubes due to thermal tensions created during the cooling. Cold working operations (cold rolling) to finished dimension follows if necessary. During the co-extrusion process the metallurgical bonding is created. This, like the layer thickness of both the components, is attested by means of a control of the finished product ready for delivery.

The present invention is based on the discovery that it is possible, by optimisation of process parameters by the extrusion to utilise a ferritic iron chromium aluminium alloyed material with very good resistance against metal dusting, by using it as out- or inside component in a so called compound tube, which fulfils the demands set on construction materials intended to be used as bayonet tubes and superheater and reformer tubes in steam reforming plants. The demands that must be satisfied are good resistance against metal dusting, oxidation resistance, sufficient mechanical properties (strength) and structure stability. The ferritic iron chromium aluminium alloyed steel is in itself previously known through eg Stahl and Thomsen; Survey of Worldwide Experience with Metal Dusting, presented at the AIChE symposium on ammonia safety, Tucson, Ariz., Sep. 18–20, 1995.

Testing in laboratory scale and in production plants has shown that the ferritic iron chromium aluminium alloy is superior to the materials normally used today in steam reforming plants.

The invention includes the use of an iron chromium aluminium alloy with ferritic structure and containing, in weight-%.

| LEVEL[1] | 1 | 2 | 3 |
|---|---|---|---|
| carbon | <0.05 | <0.10 | <0.3 |
| chromium | 15–25 | | 5–30 |
| nickel | <2 | <5 | <10 |
| manganese | <2 | | <5 |
| molybdenum | <2 | | <5 |
| aluminium | 3–7 | 3–12 | 3–20 |
| nitrogen | <0.05 | <0.10 | <0.3 |
| Ce + La + Hf + Y[2] | 0.00–0.5 | | 0.000–1.0 |
| titanium | 0.005–0.3 | 0,005–1.0 | 0.000–1.0 |
| zirconium | 0.005–0.5 | 0,005–1.0 | 0.000–1.0 |
| vanadium | 0.0051–0.5 | 0,005–1.0 | 0.000–1.0 |
| niobium | 0.0051–0.5 | 0.005–1.0 | 0.000–1.0 |
| iron | rest (except usual impurities) | | |

[1] Level 3: suitable content Level 2: preferred content Level 1: specially preferred content
[2] The addition is optional and can be made in the form of one or more of the elements. The content relates to the total content of these elements.

The alloy above will constitute the, for corrosion by metal dusting (and carburisation), exposed component in a compound tube made by co-extrusion, where the other, load carrying component consists of a lower alloyed carbon steel, a so called 9–12% chromium steel, a conventional stainless steel or a nickel base alloy. Which of the components is the outer or inner component depends on if the process gas flows on the in- or outside of the tube.

The environments where metal dusting and carburisation arise are characterised by a high carbon activity and a relatively low oxygen partial pressure in the process gas, and a normal temperature of 450–900° C. In order to be resistant against this type of corrosion a metallic material is required to have a good ability to form a protective oxide on the surface. Decisive for this ability is mainly the content of the oxide forming element in the material and the micro structure of the material. Due to the relatively low oxygen content in the gas, only three types of protective oxides can practically be formed in the actual environment: aluminium oxide, chromium oxide and silica. Steel alloys or nickel base alloys with aluminium or silicon in order to promote formation of these types of oxides result in deteriorated ductility of the alloy, which makes the making very difficult. The diffusion of the oxide forming element to the surface is critical, why it is a prerequisite in the actual temperature region that the alloy has a micro structure with a ferritic matrix.

The ferritic iron chromium aluminium alloyed material of the invention has on the other hand very low strength at high temperatures and can also be embrittled during operation by so called 475-degrees embrittlement. It is therefore not suitable for use in applications that work under mechanical stress. The low strength makes further that it is easily deformed by creep, which is negative for instance for protection against metal dusting, since the protective oxide is easily broken up. That means that the ferritic iron chromium aluminium alloyed material as such can not be used as bayonet tubes, superheater and reformer tubes in steam reforming plants.

The joining of corrosion resistant ferritic iron chromium aluminium alloyed material, which usually constitutes 20–50% of the total wall thickness, with an alloy with high strength in the form of a compound tube, so that that the iron chromium aluminium alloyed material is exposed to the corrosive process gas, a product that manages both the demands on resistance to metal dusting and mechanical (hot) strength is obtained. The tubes may have an outer diameter of 15–200 mm and a total wall thickness of 2–20 mm.

The choice of load carrying component, i.e. the component on which the ferritic iron chromium aluminium alloyed corrosion protection steel shall be applied, depends on the working temperature and the mechanical stress of the component. Besides demands on strength there are demands on resistance against oxidation in combustion gases or water vapour for the load carrying component. It can generally be said that the oxidation properties become more decisive the higher the working temperature of the component. Oxidation resistance is generally achieved by alloying with chromium. Suitable alloys for the load carrying component are therefore at higher (T≧550° C.) temperatures, austenitic stainless steels or Ni—Cr-alloys. At lower temperature (T≦550° C.) lower alloyed steels, so called 9–12% chromium steels might be suitable as load carrying component.

An example of a suitable load carrier for this type of compound tube, to be used at temperatures above 600° C., is Alloy 800H (Fe-30Ni-20Cr-0.4Al-0.4Ti). It is characterised by good creep strength and structure stability, which makes it suitable for use in pressurised applications. It has further a good oxidation resistance, which makes it resistant to for instance combustion gases.

An example of a suitable load carrier for the type of compound tube, to be used at temperatures below 600° C., is alloy SS142203 (Fe-0,15C-9Cr-1Mo). It is characterised by good hot strength and is approved for use in pressurised applications. It has further a good oxidation resistance, which makes it resistant to for instance combustion gases at the actual temperature.

Below follows a short report on the influence of each element in the final steel alloy. The influence of the elements does obviously decide the desired min.—and max.—contents according to the level overview above.

C: too high carbon content has a negative influence on the load carrying component. Carbon diffuses into it during operation, which results in a deteriorated ductility (brittleness).

N: too high nitrogen content has a negative influence on the load carrying component. Nitrogen diffuses into it during operation, which results in a deteriorated ductility (brittleness). Further nitrogen forms nitrides with aluminium, which results in lower amounts of aluminium available for oxide formation.

Cr: the chromium content should be >10% to be able to contribute to so called selective oxidation of aluminium. Too high chromium content results in great working problems.

Al: more than 3% aluminium is required in order to form a covering aluminium oxide on the material. Too high aluminium content results in working problems (brittleness).

Ni: nickel is austenite stabilising, i e at too high content the matrix is no longer ferritic, which is a prerequisite in order to form a protective oxide layer. Ni is further an expensive alloying element and should therefore be kept low.

Mo: high content of Mo can result in formation of a melted oxide at high temperatures, which reduces the metal dusting resistance of the material. Mo is also expensive.

Mn: is like nickel austenite stabilising, i e at too high content the matrix is no longer ferritic, which is a prerequisite in order to form a protective oxide layer.

Si: too high silicon content is embrittling and results in great working problems.

Ce, La, Hf, Y: These so called rare earth metals contribute to improve the adhesion of the formed oxide layer to the metal surface and to that they lower the growth speed of the oxide, which is aimed at. In high content they are harmful, since the hot ductility (hot working properties) is deteriorated. Suitable ranges for the total content of these optional elements are given in the previous Table. Moreover, when present, a suitable total content of these elements is between 0.01 and 0.5 weight %.

Ti, Zr, Nb, V: Improve the ductility by precipitation of stable carbides and nitrides, which results in a more fine grained structure and thereby better ductility. In high content they are embrittling and deteriorate also the oxidation properties of the material.

EXAMPLE 1

A steel melt with composition A according to table 1 was made in a conventional way by melting of scrap in an electric arc furnace, refining and decarburisation in an AOD converter and continues casting to size 265×365 mm. The continuously casted blank was then hot rolled to round bar of size Ø87 mm. From this bar a 250 mm long blank was cut, in which a Ø60 mm through hole was drilled.

A steel melt with composition B, which is intended for the load carrying component, according to table 1, was made in the same manner as melt A, but was instead hot rolled to round bar of size Ø60 mm. From this bar a 250 mm long blank was cut, in which a Ø20 mm through hole was drilled.

The two inserts were joined by placing the blank of melt B inside the blank of melt A, whereafter the two components were co-extruded at 1100° C. to a tube with an outer diameter of 30 mm and a wall thickness of 5 mm. The tube made in this way has an inner- and outer component with a thickness of 2.5 mm each. The achievement of metallurgical bonding was examined with metal microscope. The strength of the bonding zone was controlled by bending and found good, which confirms that metallurgical bonding was achieved.

The compound tubes made according to the invention has an, until now unattained, resistance to metal dusting and a long adequate length of life.

TABLE 1

| Charge: | A | B |
| --- | --- | --- |
| C | 0.011 | 0.067 |
| Si | 0.14 | 0.59 |
| Mn | 0.37 | 0.55 |
| Cr | 20.55 | 20.70 |
| Ni | 0.24 | 30.77 |
| Mo | 0.02 | 0.03 |

TABLE 1-continued

| Charge: | A | B |
|---|---|---|
| Al | 5.4 | 0.49 |
| Ti | 0.006 | 0.49 |
| Zr | 0.005 | — |
| N | 0.010 | 0.016 |
| V | 0.03 | 0.05 |
| Nb | 0.01 | 0.01 |
| Ce | 0.013 | — |
| La | 0.005 | — |

What is claimed is:

1. A method of use of an iron chromium alloy with a ferritic microstructure, the iron chromium alloy includes in weight-%:
carbon: <0.3,
chromium: 5–30,
nickel: <10,
manganese: <5,
molybdenum: <5,
aluminum: 3–20,
silicon: <5,
nitrogen: <0.3,
cerium+lanthanum+hafnium+yttrium: <1.0,
titanium 0.000–1.0,
zirconium: 0.000–1.0,
vanadium: 0.000–1.0,
niobium: 0.000–1.0, and
the rest iron, apart from naturally occurring impurities;
   wherein the method comprises forming a compound tube comprising a layer of a load carrying material and a layer of the iron chromium alloy.

2. Use according to claim 1, where the chromium content is 15–25 weight-%.

3. Use according to claim 1, where the nickel content is <5 weight-%.

4. Use according to claim 1, where the aluminium content is 3–7 weight-%.

5. Use according to claim 1, where the silicon content is <2 weight-%.

6. Use according to claim 1, where Ce+La+Hf+Y is <0.5 weight-%.

7. Use according to claim 1, where Ce+La+Hf+Y is between 0.01 and 0.5 weight-%.

8. Compound tube including at least one layer of an iron chromium aluminium alloy, and at least one layer of a load carrying component, wherein the iron chromium aluminium alloy has the following composition in weight-%:
carbon: <0.3,
chromium: 5–30,
nickel: <10,
manganese: <5,
molybdenum: <5,
aluminum: 3–20,
silicon, <5,
nitrogen: <0.3,
cerium+lanthanum+hafnium+yttrium: <1.0,
titanium: 0.000–1.0,
zirconium: 0.000–1.0,
vanadium: 0.000–1.0,
niobium: 0.000–1.0, and
the rest iron, apart from naturally occurring impurities.

9. Compound tube according to claim 8, wherein the outer diameter of the tube is between 15 and 200 mm and that it has a total wall thickness of between 2 and 20 mm.

10. Compound tube according to claim 8, wherein the layer of the iron chromium aluminium alloy mentioned constitutes 20–50% of the total wall thickness.

11. Compound tube according to claim 6, in the form of bayonet tubing, superheater tubing, or reformer tubing.

* * * * *